United States Patent
Jackson

[11] Patent Number: 5,954,012
[45] Date of Patent: Sep. 21, 1999

[54] METHOD AND DEVICE FOR FEEDING AQUARIUM FISH

[75] Inventor: Robert S. Jackson, Salem, Oreg.

[73] Assignee: Healthline USA, Salem, Oreg.

[21] Appl. No.: 08/931,951

[22] Filed: Sep. 17, 1997

[51] Int. Cl.⁶ .................................................. A01K 61/02
[52] U.S. Cl. ........................................ 119/230; 119/51.04
[58] Field of Search ............................ 119/51.03, 51.04, 119/230

[56] References Cited

U.S. PATENT DOCUMENTS

| | | | |
|---|---|---|---|
| 3,499,526 | 3/1970 | Willinger | 119/51.04 X |
| 3,742,912 | 7/1973 | Chen et al. | 119/51.03 |
| 4,903,636 | 2/1990 | Kroeker | 119/230 X |
| 5,778,824 | 7/1998 | Musgrave et al. | 119/230 |
| 5,806,458 | 9/1998 | Harwich | 119/51.03 |

*Primary Examiner*—Robert P. Swiatek
*Attorney, Agent, or Firm*—ipsolon llp

[57] ABSTRACT

An aquarium fish feeder and a method of feeding fish with a fish feeder. The fish feeder includes mesh walls, a stiffening member and a suspension device. The feeder receives fish food, which is urged against a mesh wall, and the feeder is submerged in water in an aquarium. Fish feed by eating food through the mesh or by eating food that protrudes through the mesh. After the fish have eaten, the container with uneaten food may be removed to prevent fouling of the aquarium water. The stiffening member allows the feeder to be configured and held in a desired shape to allow greater access to the feeder for a greater number of fish. The suspension device permits the feeder to be suspended above the aquarium bottom.

20 Claims, 2 Drawing Sheets

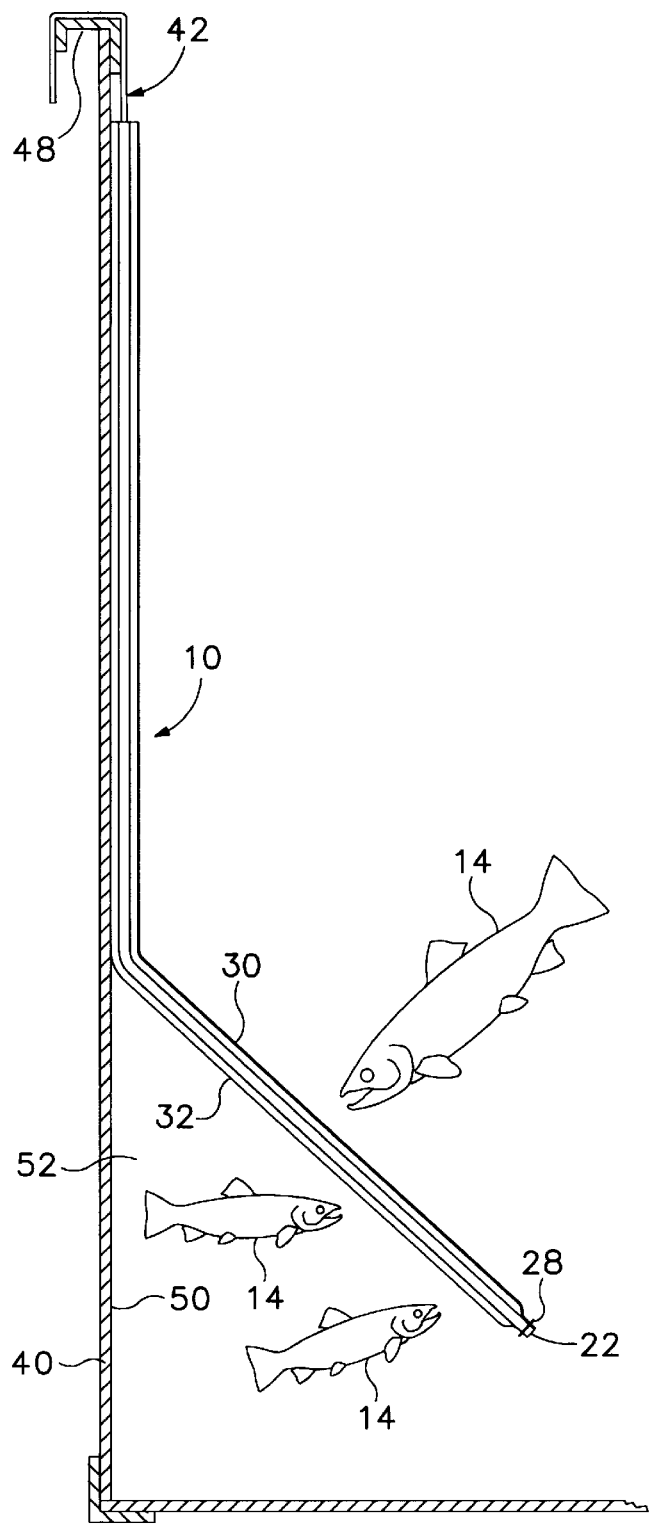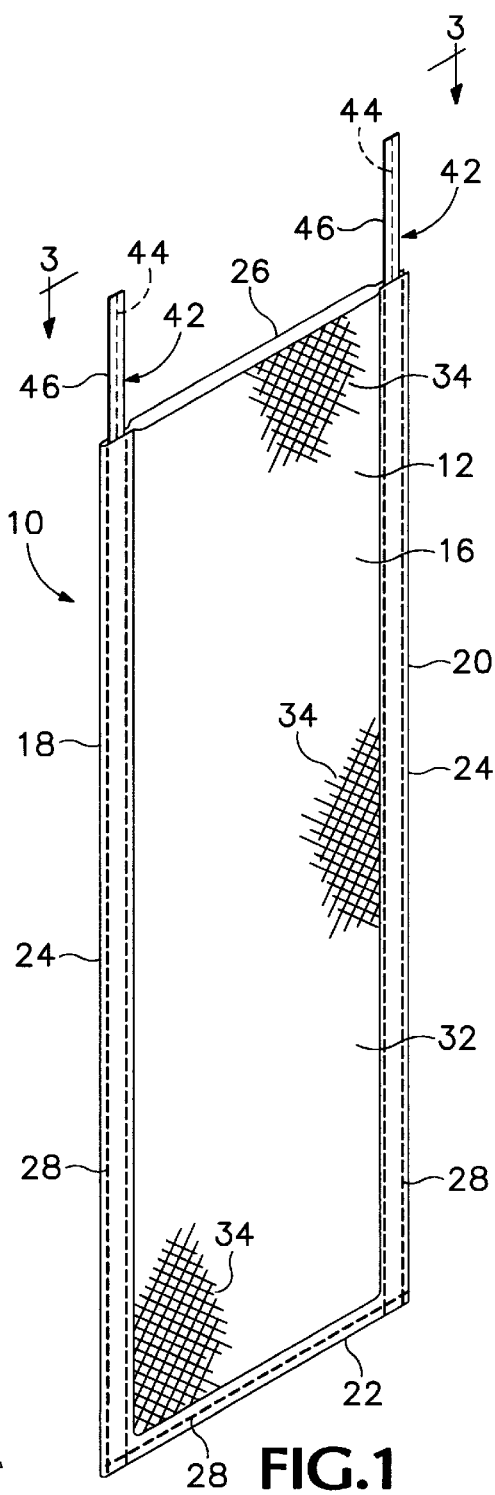
FIG.2
FIG.1

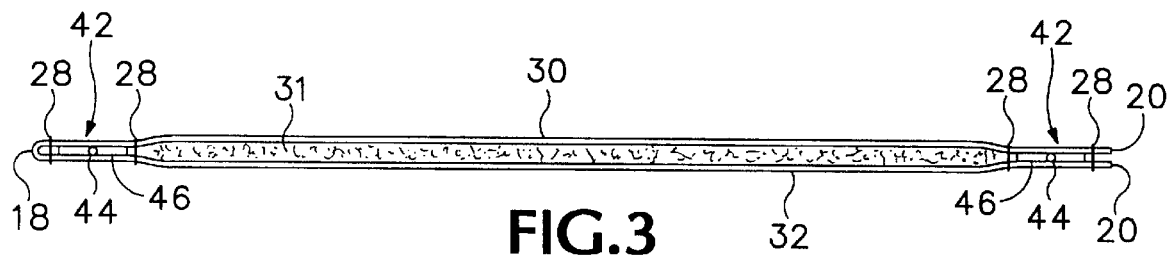
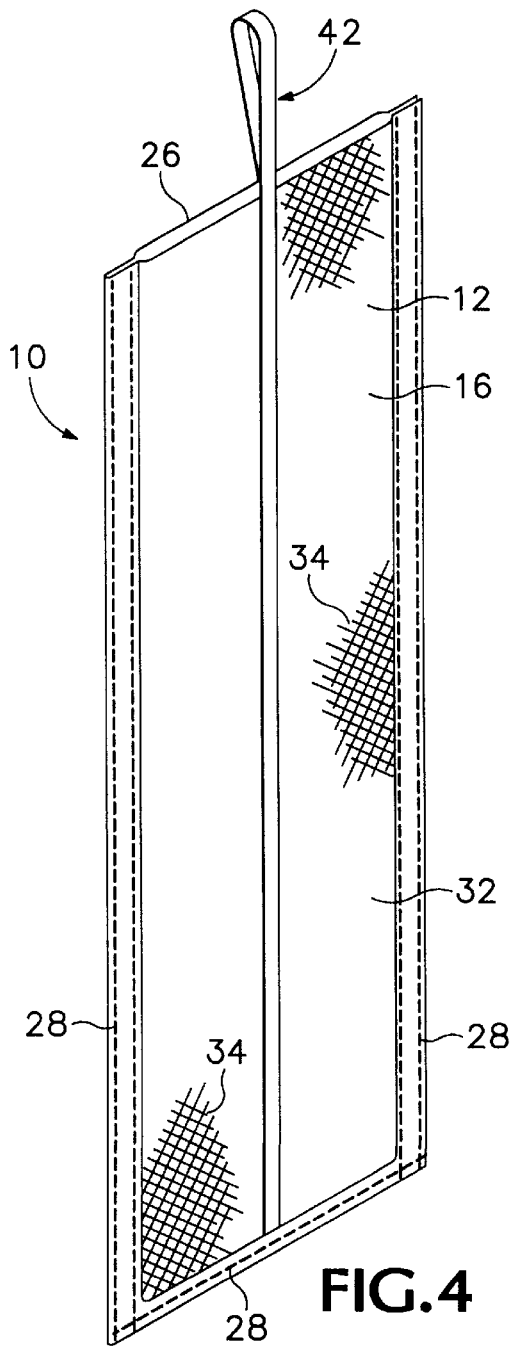

METHOD AND DEVICE FOR FEEDING AQUARIUM FISH

BACKGROUND OF THE INVENTION

1. Field of the Invention

This invention pertains to methods and devices used to deliver food to fish in aquariums. The invention does not have a timer or electronics.

2. Description of the Related Art

Aquariums are water-filled tanks, usually with glass sides. The term "aquarium" applies to tanks for home use, in which fish are kept for their decorative effect and interesting habits, and to public institutions with tanks for exhibition and scientific study of aquatic life. Aquariums may be for salt-water or fresh water use.

Feeding fish in aquariums is an important step in their care. However, several problems are associated with proper fish feeding. Overfeeding fish may cause health problems and foul the aquarium water. Aggressive fish may quickly eat most of the food, leaving the smaller fish hungry. Food that is not eaten quickly enough may sink to the bottom and, after sufficient time, require cleaning.

To prevent overfeeding it is sometimes recommended that aquarium fish be restricted to an amount of food that can be eaten in three minutes. Determining the proper quantity can be difficult, particularly for inexperienced aquarium owners and after adding new fish with unfamiliar habits. Often, trial and error is the only way to determine the proper amount of food to provide, but errors can be costly.

Generally speaking, there are five categories of fish food: (1) processed foods (generally packaged as flakes, sticks or pellets; (2) freeze dried foods; (3) frozen foods; (4) live foods; and (5) other fresh foods. Each food category presents different considerations. For example, hobbyist aquarium owners may sprinkle dry food flakes on top of the aquarium water. The flakes spread out over the water surface and fish feed from the surface. Frozen food may be placed into the aquarium in two or three chunks that fish pick at. Such chunks are particularly susceptible to hoarding by aggressive fish.

Some prior art fish feeders provide an apparatus that incorporates a timer for feeding fish on a timed schedule. These devices may assist with unattended feeding, as when an aquarium owner is away for an extended time, but they inadequately address the other problems noted. For example, judgment and experience are still required to determine the proper quantity of food to put in the feeder and any excess food tends to foul the aquarium water.

An additional problem associated with fish in aquariums, albeit unrelated to food, is the ready observance and detection of fish having ailments. Ailing fish may hide among foliage and coral often placed in aquariums, thus preventing inspection of the fish.

The perfect time to observe fish is during their feeding. However, most categories of food do not lend themselves to close inspection of the fish. The flake food described above spreads itself over the surface of the water and the fish likewise spread out to eat the food. Additionally, all types of food can be grabbed by the fish and carried to a preferred location for eating, which location may not permit ready viewing of the fish.

SUMMARY OF THE INVENTION

The present invention solves the above noted problems by providing a fish feeder that delivers food to fish in a controllable manner. The fish feeder of the present invention also permits an aquarium owner to provide a quantity of food to fish for a fixed amount of time and then remove food that is not consumed.

Additionally, the fish feeder of the present invention delivers food to fish in a manner that aggressive fish and passive fish can simultaneously feed without interference. The fish feeder of the present invention also feeds fish at a central location permitting easy inspection of the fish.

The present invention is a method and device for feeding aquarium fish; the device having a preferred embodiment comprising a perforated container that holds fish food and that can be submerged to permit fish to access food in the container. Preferably, the fish feeder of the present invention is configured to permit fish to access the food in the container from multiple sides of the container and the fish feeder is suspended above the aquarium bottom.

In a preferred embodiment of the invention, the fish feeder is fabricated of a mesh that is substantially inert in water. A nylon mesh is suitable. The preferred embodiment includes a stiffening member, such as a wire, coupled to the mesh so that the container may be configured as desired to promote fish access to the food in the container. In the preferred embodiment, the wire may extend beyond the dimensions of the container so as to be useful for suspending the container from a top of the aquarium. To prevent corrosion, the wire may be plastic coated.

Other shapes, materials and arrangements of parts are envisioned in alternative embodiments.

BRIEF DESCRIPTION OF THE DRAWINGS

FIG. 1 is a perspective view of a fish feeder of the present invention.

FIG. 2 is cut-away view of an aquarium showing the fish feeder of the present invention located in the aquarium and fish approaching the feeder.

FIG. 3 is a top plan view of the fish feeder as seen from line 3—3 of FIG. 1.

FIG. 4 is a perspective view of a second preferred embodiment of the present invention.

DESCRIPTION OF THE PREFERRED EMBODIMENTS

With reference to FIGS. 1–4, the preferred embodiments of the present invention will be described.

FIG. 1 is a perspective view of a preferred embodiment of a fish feeder 10 of the present invention. The fish feeder 10 includes a container 12 that receives and delivers food to aquarium fish 14 in an aquarium 40 (FIG. 2) or other body of water.

The container 12 comprises a sheet 16 of material that is folded along a midline 18 and joined at its loose edges 20 and a bottom edge 22. Preferably, the sheet is also joined at the midline 18 to maintain sides 30 and 32 of the structure in proximity. The container is thus closed along lateral edges 24 and bottom 22. (The loose edges 20 and midline 18 become the lateral edges 24 upon fabrication.) The container is open at a top margin 26.

Stitching 28 preferably joins the sheet 16 along the lateral edges 24 and bottom 22, however alternative forms of joining are also suitable. Additionally, the container may be formed of several sheets, or a single sheet 16 as described and shown.

By joining the container as described, the sheet 16 forms the sides, or walls, 30 and 32 that are held in proximity. As described in greater detail below, food 31 placed in the container 12 will be trapped between the proximate sides 30 and 32.

The approximate dimensions of the container are 11.5 by 30.0 centimeters. Alternative, suitable containers may be larger or smaller. Also, the container need not be rectangular.

In the preferred embodiment, the sheet 16 is of a material that is substantially inert in water, such as nylon. Preferably, the sheet material is woven and includes a plurality of openings 34. A nylon mesh is suitable for the sheet material. In alternative embodiments, the sheet material need not be inert in water. Alternative embodiments may use a sheet material that degrades in the environment. The fish feeder of the present invention may be suitable as a disposable feeder (e.g., a feeder having prepackaged food that is discarded after use).

The openings 34 permit fish to access food in the container without permitting food to freely escape the container. Accordingly, the openings are sized to accommodate the fish that will use the feeder and the food that will be dispensed by the feeder.

In the preferred embodiment, the sheet material is somewhat stiff so as to maintain its manufactured shape. The stiffness assists in maintaining the food in the container and presenting the food to fish.

Food 31 is inserted in the container 12 by gripping the container at the lateral edges 24 and pressing the lateral edges toward each other. As the lateral edges 24 move toward one another, the sides 30 and 32 will spread apart at the top margin 26 thus opening the container. Food may then be dropped into an interior of the container between the sides 30 and 32. Thereafter, the pressure on the lateral edges is relaxed and the sides will come into proximity trapping the inserted fish food in the container.

The structure and material properties cause the container 12 to be resilient whereby the sides 30 and 32 are urged into proximity. The resiliency permits the edges 24 to be squeezed causing the sides 30 and 32 to spread apart, and when the edges 24 are released, urges the sides 30 and 32 into contact with the food in the container. Because the food is urged into contact with the sides 30 and 32, the food is proximate the openings 34 permitting fish to access the food when it is placed into the aquarium.

Additionally, the resiliency permits using the fish feeder with different classifications of food. Flake food fits in the container and is urged against the openings 34 when the lateral edges 24 are relaxed. Likewise, larger food fits into the container when it is opened and is urged against the openings 34 when the edges 24 are relaxed. As fish eat the food, the resiliency keeps the sides 30 and 32, and hence the openings 34, urged against the food.

The fish feeder 10 also includes a stiffening member 42. In the embodiment of FIGS. 1–3, stiffening members 42 are located along each of the lateral edges 24. In the embodiment of FIG. 4 the stiffening member 42 is doubled over and located near a proximal midline, and on one side 30 or 32, of of the container 12.

The stiffening member 42 preferably comprises a wire 44 coated with plastic 46. In the embodiment shown in the FIGS. 1–3, additional stiffening may be achieved by using two wires along each lateral edge. Additional stiffening may be particularly suitable for stiffer grades of container sheet material 16.

The stiffening member 42 may extend the entire length of the container 12, as shown in the embodiments of FIGS. 1–3 and FIG. 4. Alternatively, the stiffening member(s) may extend along a portion of the container that is less than the entire length.

Additionally, the stiffening members 42 may extend beyond the top margin 26 for use as a suspension device. When the stiffening members so extend, they may be configured into a "hook" shape for hanging onto an upper edge 48 of the aquarium 40, as shown in FIG. 2. When used in this manner, it is desirable to place the food toward the bottom of the fish feeder so that the food is located approximately five to 30 centimeters below the water surface when feeding the fish (and more preferably the food is located ten to 25 centimeters below the water surface).

When the fish feeder 10 is suspended from the top edge of the aquarium, the feeder tends to lie along the inner surface 50 of the aquarium 40. However, it is desirable to configure the feeder so that both sides 30 and 32 are accessible to the fish 14. The stiffening members 42 permit the feeder to be configured in a "dogleg" so that a portion of the feeder projects away from the glass surface 50, as shown in FIG. 2. Other possible configurations also achieve the same objective.

In operation, food 31 is inserted into the container 12 and the container is lowered into the aquarium 40 having water 52 and fish 14. Fish flock to the container and access the food through the openings 34. When the fish finish eating, or when the aquarium owner determines the fish have eaten a sufficient amount, the container 12 may be removed. Most uneaten food remains in the container and is thus removed with the container.

In this manner, the owner has an opportunity to view the fish as they eat. The localized feeding causes the fish to visit the container and be available for inspection. Also, by presenting fish food in the container, uneaten food may be removed and the opportunity for over feeding is substantially reduced.

Based on the foregoing description and the figures, it can be seen that the features and combination of features of the present invention address the problems associated with prior art feeders.

The specification describes materials, shapes, configurations and arrangements of parts for making and using the invention. However, it is intended that the scope of the invention shall be limited by the language of the claims only and the law of the land as pertains to U.S. patents.

What is claimed is:

1. A method of feeding fish in an aquarium, comprising the steps:

(a) placing fish food into a container through a food port, the container having a plurality of openings;

(b) closing the container so that a volume of the container changes to accept the food placed in the container and food is located proximate the openings; and (c) inserting the container into an aquarium so that fish can access the food in the container.

2. The method of claim 1 further comprising suspending the container above a bottom of the aquarium.

3. The method of claim 1 wherein the step of placing fish food further comprises opening the container food port and the step of closing the container includes closing the container food port.

4. The method of claim 1 further comprising configuring the container so that a portion of the container is proximate a wall of the aquarium and another portion of the container is set apart from a wall of the aquarium.

5. The method of claim 1 wherein the step of placing fish food further comprises opening the container food port and inserting food into the container and the closing step further comprises closing the container food port so that the food is urged against the openings by the container.

6. The method of claim 1 wherein the container includes first and second walls wherein the openings are located and the step of placing fish food includes separating the first and second wall so as to open the food port and the step of closing the container includes bringing the first and second wall into proximity.

7. The method of claim 1 wherein the the closing step includes closing the container food port so that the food is accessible through the openings only.

8. The method of claim 1 further comprising configuring the container into a dogleg to provide greater access to the food for more fish.

9. The method of claim 1 further comprising pressing against edges of the container so as to open the food port and releasing edges of the container to close the food port.

10. An aquarium fish feeding device, comprising a mesh container having a ductile member for configuring the container from a first configuration to a second configuration to permit fish to access sides of the container, whereby food is placed in the container so as to contact the mesh sides thereof and the container is submerged in aquarium water for feeding aquarium fish.

11. The aquarium fish feeding device of claim 10 further comprising a suspending device for suspending the feeding device in the aquarium above a bottom of the aquarium.

12. The aquarium fish feeding device of claim 11 wherein the suspending device is an extension of the ductile member.

13. The aquarium fish feeding device of claim 10 wherein the mesh container includes at least two walls that are proximate and the walls are coupled along edges of the walls whereby the walls are urged into a proximate relationship.

14. The aquarium fish feeding device of claim 10 wherein the ductile member is plastic coated wire.

15. The aquarium fish feeding device of claim 10 wherein the container has a length of approximately 30 centimeters so that food located in container is suspended approximately 10 to 30 centimeters below the water surface when the device is located in an aquarium.

16. An aquarium fish feeding apparatus, comprising an aquarium and a food container, the food container having a variable volume to accommodate fish food and the food container having opposed walls in proximity, at least one wall having openings, and a suspending device, whereby the walls are urged into proximate relationship and food placed in the container contacts the at least one wall having openings and separates the walls thereby changing the volume to accommodate the fish food and the fish feeding device can be suspended by the suspending device to suspend the fish feeding device above a bottom surface of an aquarium.

17. The apparatus of claim 16 further comprising a ductile member that can be deformed to configure the container.

18. The apparatus of claim 16 further comprising a ductile member wherein the ductile member and the suspending device are plastic coated wire.

19. The apparatus of claim 16 wherein the opposed walls are nylon mesh.

20. The apparatus of claim 16 wherein the opposed walls are substantially rectangular.

* * * * *